May 11, 1926.
L. BERTELE
1,584,272
PHOTOGRAPHIC LENS
Filed Jan. 13, 1923
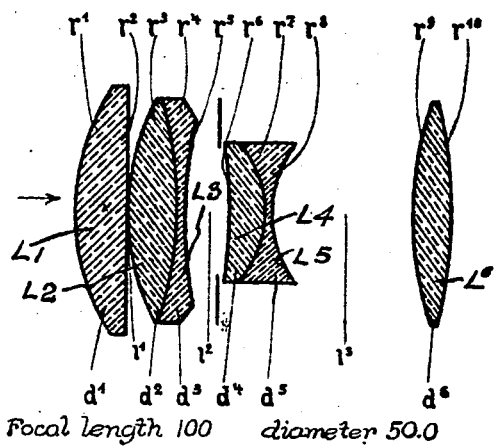
Focal length 100   diameter 50.0
| | |
|---|---|
| $r_1 = +46.67$ | $d_1 = 10.0$ |
| $r_2 = \infty$ | $l_1 = .0$ |
| $r_3 = +48.33$ | $d_2 = 10.0$ |
| $r_4 = -125.00$ | $d_3 = 1.67$ |
| $r_5 = +204.53$ | $l_2 = 8.36$ |
| $r_6 = -125.00$ | $d_4 = 6.67$ |
| $r_7 = -21.67$ | $d_5 = 1.67$ |
| $r_8 = +23.95$ | $l_3 = 28.25$ |
| $r_9 = +67.30$ | $d_6 = 7.50$ |
| $r_{10} = -94.75$ | |
| | $n_D$ | $n_{G'}$ |
|---|---|---|
| $L_1$ | 1.5467 | 1.55769 |
| $L_2$ | 1.5904 | 1.6026 |
| $L_3$ | 1.6788 | 1.70089 |
| $L_4$ | 1.6315 | 1.65501 |
| $L_5$ | 1.6235 | 1.64457 |
| $L_6$ | 1.6225 | 1.63760 |
Witnesses:
Inventor:
Ludwig Bertele
By William C. Linton
Atty.

Patented May 11, 1926.

1,584,272

UNITED STATES PATENT OFFICE.

LUDWIG BERTELE, OF DRESDEN, GERMANY.

PHOTOGRAPHIC LENS.

Application filed January 13, 1923. Serial No. 612,564.

The present invention relates in particular to improvements in lenses employed in cinematographic cameras and projectors and such an improved lens is superior to ordinary lenses with anastigmatic planing of the view field in permitting a very large proportion of aperture without any loss of definition; the reason for this condition is that spherical aberration for any color and any height of incidence has been absolutely removed while curvature of the view field has been completely avoided. This advantage is attained by abandoning the diverging or slightly converging course of rays behind the central member, as heretofore used in connection with all known lenses with diffusing central member consisting of one or more lenses, in favor of a considerably converging course of rays.

One way to reach this goal is to choose a strongly refractive converging front member. As inevitably, under very large proportions of aperture, considerable curvatures result therefrom, practical reasons forbid to construct the collective front member as a single lens and it has, therefore, been divided into collective systems separated by an air-filled space. The course of the coma correction demands the meniscus form for at least the second collective system in the convergent front member. With the lens arrangement described above the correction of the spherical aberration, astigmatism, curvature of the view field, the sine condition, the coma and distortion can be carried through. The possibility of a perfect achromatism as required by an aperture of that size appears to be excluded.

The drawings illustrate a sectional view of a lens embodying the present invention.

Continued experiments have, however, shown that these are not the only ways of attaining a satisfactory chromatic correction of the said lens and that it is possible to get chromatic correction in another manner without influencing unfavorably the correction of spherical aberration, astigmatism, the curvature of the view field etc. All chromatic errors can be removed by introducing into one of the convergent lenses of the front collective member, or into both, and, in addition, into the central dispersing member a cemented doublet. It can be observed that by introducing one cemented doublet each into only one convergent lens of the front collective member and into the central dispersing member the remaining chromatic errors appear in sufficiently small amounts. An additional cemented doublet in the other convergent lens of the front collective member would therefore bring about only theoretical but no practical improvements.

The lens comprises three members: a front collective member comprising two systems, a central dispersing member, and a second collective member.

Referring to the drawings $L^1$ is a single positive lens which constitutes the first system of the front collective member. The second system is made up of two lenses $L^2$ and $L^3$ which form a doublet, and may be cemented together with the cemented surface concave to light entering from the left in the drawing. The lens $L^2$ is positive and is made of a glass of low chromatic dispersion, while the lens $L^3$ is negative and is made of a glass of higher chromatic dispersion than the positive lens $L^2$. This doublet will, therefore, act in the sense of chromatic super-correction. The central dispersing member also comprises a cemented doublet in which the lens $L^4$ is positive, and has a higher chromatic dispersion than the lens $L^5$ which is negative. The cemented surface of this doublet, like that of the aforementioned doublet, is concave to light entering from the left in the drawing. The effect of this doublet is, therefore, in the direction of chromatic under-correction.

The third member is a single collective lens $L^6$ which is placed at a relatively great distance from the second member.

It will be seen that the doublet which is placed in the front collective member will act in chromatic contradistinction to the doublet which forms the central dispersing member, the effect of one being super-correction, and the effect of the other being under-correction.

The doublet forming the second collective system is given the form of a meniscus in order to bring about a more perfect correction for the coma condition.

In the drawings $d_1$, $d_2$, $d_3$, $d_4$, $d_5$ and $d_6$ constitute the thicknesses of the lenses $L^1$, $L^2$, $L^3$, $L^4$, $L^5$ and $L^6$ respectively.

The following explanatory example is based upon the supposition that one cemented surface (acting in the sense of super-correction) has been positioned in the second convergent lens of the positive front member while the other cemented surface has been placed in the negative central member whereby both cemented surfaces are concave towards the rays of light entering.

Focal length=100; diameter=50.0

$r_1 = + 46.67 \quad d_1 = 10.0$
$r_2 = \infty \quad l_1 = .0$
$r_3 = + 48.33 \quad d_2 = 10.0$
$r_4 = -125.00 \quad d_3 = 1.67$
$r_5 = +204.53 \quad l_2 = 8.36$
$r_6 = -125.00 \quad d_4 = 6.67$
$r_7 = - 21.67 \quad d_5 = 1.67$
$r_8 = + 23.95 \quad l_3 = 28.25$
$r_9 = + 67.30 \quad d_6 = 7.50$
$r_{10} = - 94.75$

| | $n_D$ | $n_G'$ |
|---|---|---|
| $L_1$ | 1.5467 | 1.55769 |
| $L_2$ | 1.5904 | 1.60260 |
| $L_3$ | 1.6728 | 1.70089 |
| $L_4$ | 1.6315 | 1.65501 |
| $L_5$ | 1.6235 | 1.64457 |
| $L_6$ | 1.6225 | 1.63760 |

The chromatic correction may also be obtained by a slightly modified arrangement. In this modified form the central dispersing doublet is arranged for chromatic super-correction instead of under-correction, and in compensation therefor a doublet arranged for chromatic under-correction is inserted into the front collective member.

Having now described my invention and how the same is to be performed, what I claim and desire to secure by Letters Patent is:—

1. A lens with removed curvature of the view field comprising a central dispersing member, a collective member on each side of said dispersing member and separated therefrom by interjacent spaces, one of said collective members comprising two collective systems, one of said collective systems comprising a doublet, and the central dispersing member also comprising a doublet, said doublets being chromatically antagonistic.

2. In a lens, according to claim 1, an arrangement such that one of the collective systems in the front collective member comprises a positive lens with low chromatic diffusion and a negative lens with high chromatic diffusion.

3. In a lens, according to claim 1, an arrangement such that the negative central member comprises a positive lens with high chromatic diffusion and a negative lens with lower chromatic diffusion than that of the positive lens.

4. In a lens, according to claim 1, an arrangement such that the axially parallel falling border rays converge strongly after their emersion from the dispersing central member.

5. A lens with removed curvature of the view field comprising a dispersing member comprising a doublet, a collective member positioned on each side of said dispersing member and separated therefrom by interjacent spaces, one of the said collective members comprising two collective systems one of which is a doublet in the form of a meniscus.

6. A lens composed of three members in order as follows; a front collective member comprising two positive collective systems one of which is a doublet, a dispersing member comprising a doublet, and a positive member.

7. A lens according to claim 6 wherein the two doublets placed respectively in the front collective member and the negative member are chromatically antagonistic.

8. A lens according to claim 6 wherein the doublet positioned in the front collective member comprises a positive lens of low chromatic dispersion and a negative lens of high chromatic dispersion, the effect of the combination being one of chromatic super-correction.

9. A lens according to claim 6 wherein the doublet positioned in the dispersing member comprises a negative lens, and a positive lens of higher chromatic dispersion than the negative lens, the effect of the combination being one of chromatic under-correction.

10. A lens according to claim 6 wherein one of the positive collective systems of the front member is a single positive lens, and the third member is also a single positive lens.

11. A lens with anastigmatic planing of the view field and great rapidity, comprising a dispersive member and three collective members, two of said collective members being positioned before, and another of said collective members being positioned behind the negative member, one of the first two collective members being a doublet, the positive lens of which consists of a glass with materially lower chromatic dispersion than the negative lens; and the dispersive member being a doublet, the glass of the positive lens showing a higher chromatic dispersion than the glass of the negative lens.

12. A lens according to claim 6 wherein the doublet positioned in the front member is given the form of a meniscus.

13. A lens comprising six pieces as follows: a single collective lens, a collective doublet of a positive member and a negative member, a dispersing doublet of a positive member and a negative member, and a second single collective lens.

14. A lens comprising two chromatically antagonistic doublets located between two positive single members.

15. A lens according to claim 14 wherein one of the doublets acts in the sense of chromatic super-correction, and the other acts in the sense of chromatic under-correction.

In testimony whereof I affix my signature.

LUDWIG BERTELE.